Nov. 7, 1961     O. P. MANDRAPA     3,007,255

CENTRIFUGAL HONEY EXTRACTORS

Filed July 29, 1957     3 Sheets-Sheet 1

INVENTOR.
OBREN P. MANDRAPA

BY

ATTORNEY

Nov. 7, 1961  O. P. MANDRAPA  3,007,255
CENTRIFUGAL HONEY EXTRACTORS
Filed July 29, 1957  3 Sheets-Sheet 2
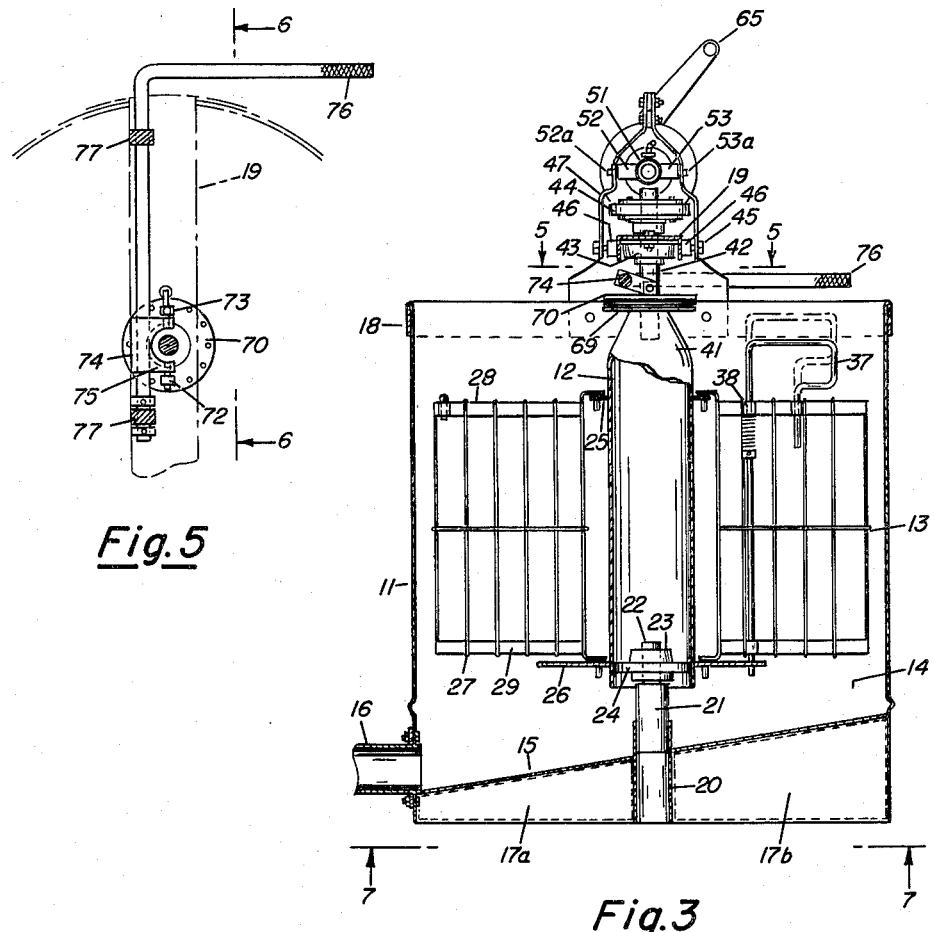
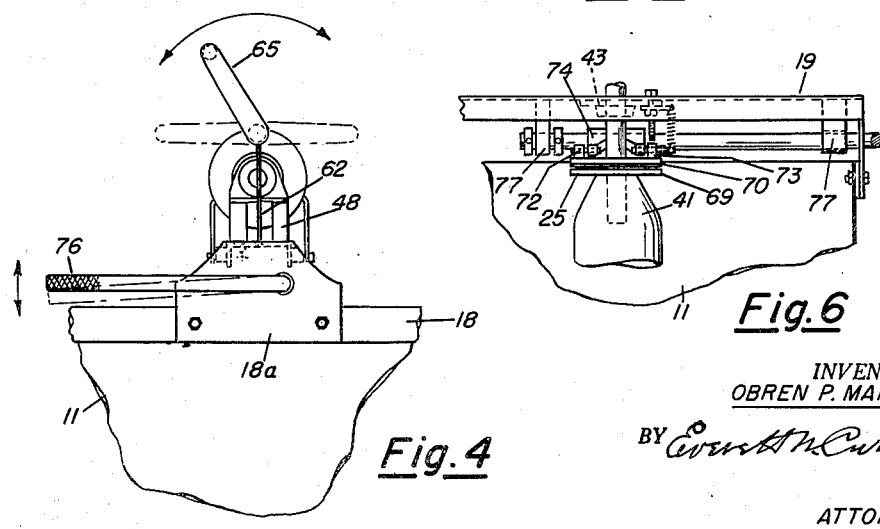
INVENTOR.
OBREN P. MANDRAPA
ATTORNEY Nov. 7, 1961 — O. P. MANDRAPA — 3,007,255
CENTRIFUGAL HONEY EXTRACTORS
Filed July 29, 1957 — 3 Sheets-Sheet 3

INVENTOR.
OBREN P. MANDRAPA
BY
ATTORNEY

United States Patent Office 3,007,255
Patented Nov. 7, 1961

3,007,255
CENTRIFUGAL HONEY EXTRACTORS
Obren P. Mandrapa, P.O. Box 1025, Calexico, Calif.
Filed July 29, 1957, Ser. No. 674,736
4 Claims. (Cl. 34—58)

My invention relates to centrifugal honey extractors, and its objects are to provide a new and efficient means for adjusting the radial inclination of the comb baskets so as fully to accomplish the centrifugal discharge of the honey from each side of the comb and body thereof, without danger of crushing the same or causing injury thereto, and to render said combs thereafter available for refilling upon their restoration to the hive; to furnish a new form of honey extracting machine, largely automatic in character, and the operation of which may be successfully performed by an ordinary routine workman instead of the highly skilled mechanic usually required to operate this type of machine; to provide efficient assembly and association for hingedly mounting the comb baskets upon a central shaft and uniformly adjusting in equally spaced radial inclination said baskets thereto, and locking the same in adjusted position; to provide a new and improved means for controlling the starting, stopping, reversal, and continuation of the centrifugal turning mechanism to the degree required for keeping intact the body of the combs while allowing the complete removal of the honey therefrom; and in general to provide a centrifugal honey extractor which is simple and economical of construction, saving of labor, efficient in action and of prolonged life and durability. My invention further consists of other novel features of construction, and combinations and arrangements of parts illustrated in the drawing, and hereinafter more specifically described and claimed.

The present invention is an improvement upon the invention heretofore made by me and as set forth in the application resulting in U.S. Letters Patent No. 2,732,945, for Honey Extracting Machines, dated January 31, 1956.

Attention is hereby directed to the accompanying drawing, illustrating a preferred form of my invention, in which similar numerals of designation refer to similar parts throughout the several views, and in which:

FIG. 3 is a vertical section on line 3—3, of FIG. 1, looking in the direction indicated by the arrows;

FIG. 4 is an enlarged detailed end view of the supporting brackets, shift handle, brake handle and adjacent parts shown in FIG. 1, looking in the direction indicated by the arrows 4—4;

FIG. 5 is a plan view, partly in section, of the braking mechanism and brake handle, on line 5—5 of FIG. 3, looking in the direction indicated by the arrows;

FIG. 6 is a side elevation, partly in section, of the brake assembly shown in FIG. 5, looking in the direction indicated by the arrows 6—6;

Figure 1:
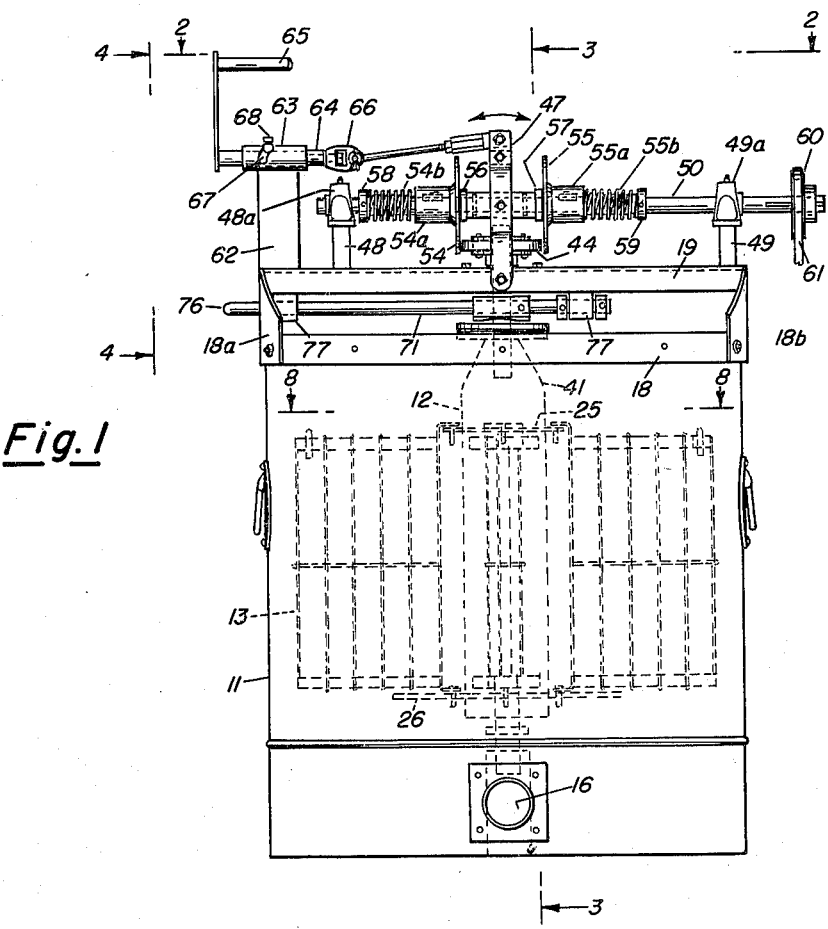
FIGURE 1 is a side elevation of an centrifugal honey extractor embodying said form of my invention, the position of the honey baskets inside of said extractor being indicated in dashed lines.

Referring to the drawing, the centrifugal honey extractor there shown generally comprises the upright open can 11, the enlarged hollow shaft 12 rotatably mounted therein, the honey comb basket assembly 13 (all of which parts are preferably of metal), together with power driven mechanism connected with said can for rotating said hollow shaft, and associated with devices for shifting, adjusting, braking, reversing, and locking said mechanism as required for the continued or cessation of the operation of said extractor.

Figure 7:
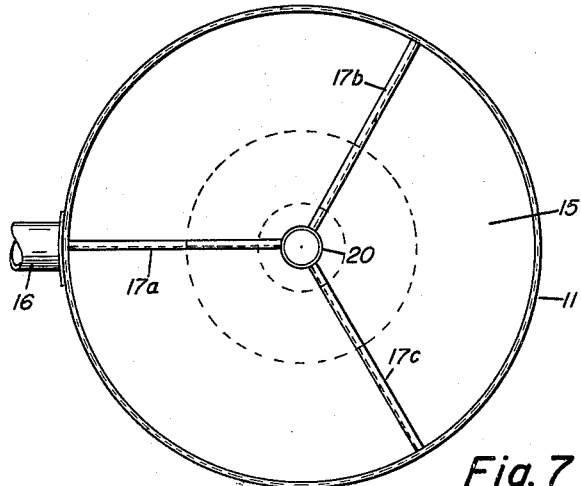
FIG. 7 is a bottom view of the can or casing of the honey extractor shown in FIG. 3, looking upwardly in the direction indicated by the arrows 7—7.

The can 11 is a casing preferably cylindrical in character, and is provided with a comparatively large chamber 14 located at the base thereof, extending wall to wall, and having an inclined run-off floor plate 15 and the outlet 16 leading therefrom; the said plate 15 closing the bottom of said can and welded thereto, and being reinforced by the ribs 17a, 17b and 17c (see FIG. 7); and the bottom of said can being shaped and positioned to rest squarely upon the floor or ground and to maintain the said can in upright position. Encircling the rim of the can and riveted, or welded thereto, is the reinforcing band 18 and bolted to said band through said rim on opposite sides thereto are the upwardly extending brackets 18a and 18b, to the walls of which are welded the ends of the channel iron forming the bridge 19.

As shown in FIG. 3, the central portion of the inclined runoff plate 15 has extending therethrough and welded thereto and the central portion of the base plate has resting thereon and welded thereto the cylindrical socket 20, the axis of which is in linear extension of the axis of said shaft 12. Welded to or securely lodged within said socket is the gudgeon 21, having an extension 22 reduced in diameter arising therefrom and journalled within the rings 23 centrally secured to the annular inwardly protruding ledge 24 welded to the wall of the bottom portion of the hollow shaft 12.

The shaft 12 is a long metallic cylinder of large diameter with a wall of substantial thickness, to which are welded radially extending members which may be an upper flange 25 and a lower flange 26; the flange 25 being narrow and located to encircle the upper portion of said shaft, and the flange 26 being wide and located to encircle the bottom portion of said shaft.

The comb bracket assembly 13 comprises the separable honeycomb baskets a, b, c, d, e, f, g, and h, radially surrounding the cylinder of said shaft 12; each of said baskets being hingedly connected top and bottom with the flanges 25 and 26 in the manner about to be described. Each of said comb baskets is open at the top and extends the full height of the assembly, and is shaped to receive and hold the conventional rectangular section of honeycomb employed. The sides and bottom of each said basket are open, except for U-shaped sets of wires 27 extending vertically on the sides and horizontally across the bottom thereof; each of said sets being welded to the ring 28 at the top and to the ring 29 at the bottom of the basket, and the said wires being in spaced parallel relation and in sufficient number to hold the section in outwardly extended position, so as not to interfere materially with the centrifugal extraction of the honey from the honeycomb upon rotation of the comb basket assembly 13. Welded to and vertically extending over and between the rings 28 and 29, and located at the inner end of each basket, is the strip 30; the lower and upper ends of which are bent at a right angle to form the lips 31 and 32, having welded thereto and respectively depending therefrom the lugs 33 and 34, which lugs are located to make pivotal engagement with spaced openings formed to receive the same circumferentially in flanges 25 and 26.

Through this arrangement of parts, each of the comb baskets individually is hingedly connected to the wall of the shaft 12, and in order that the said baskets may be uniformly and equally spaced apart and inclined, I preferably provide the connecting rods 35, each of the same length and having its ends bent at an angle to engage with eyes 36 welded to the outer ends of the baskets and extending between adjacent baskets; the space between two of said baskets *a* and *h* being left free of the rod in order that the inclination of the baskets may be uniformly accomplished.

Figure 2:
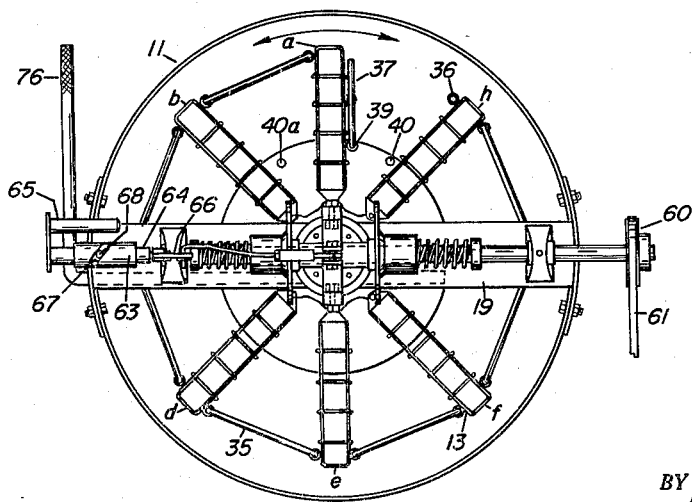
FIG. 2 is a plan view of the extractor shown in FIG. 1, looking downwardly in the direction indicated by the arrows 2—2.
Figure 8:
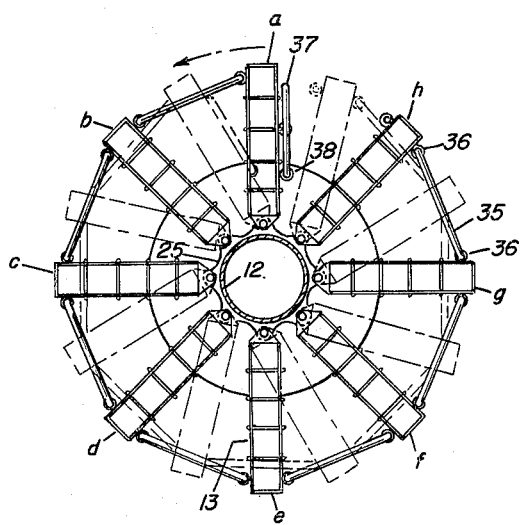
FIG. 8 is a plan view, partly in section, of the honey basket assembly, indicated in dashed lines of FIG. 3, looking downwardly in the direction evidenced by the arrows 8—8 of FIG. 1.
Figure 10:
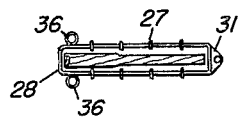
FIG. 10 is a plan view of the basket loaded with honey comb as shown in FIG. 9, looking downwardly in the direction indicated by the arrows 10—10.
Figure 9:
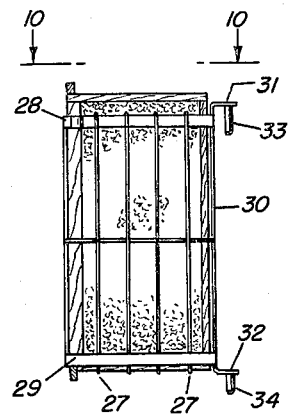
FIG. 9 is a side elevation, partly in section, of one of the honey baskets separated from said assembly, and showing a section of the honey comb introduced therein.

To lock said baskets in position after said inclination has been brought about, I preferably supply the locking bar or handle 37; the upper part of which is looped to form a handhold and whose end is bent downwardly to engage with an eye 38 welded to basket *a*, and the lower end of which handle extends downwardly to effect engagement with an opening 39 formed to receive the same in the lower flange 26. Two of these openings last mentioned are shown in FIG. 2, one, 39, for locking the direct radial arrangement of the comb baskets, and one, 40, for locking said baskets in position when inclined as shown in dashed lines in FIG. 8. Obviously, however, more of said openings could be provided, such as 40a, in the flange 26, if opposite angular divergence be required. In fact, better to accomplish the extraction of the honey from the honeycomb to the fullest extent, I prefer in the operation of my machine first to incline and lock the comb baskets on one side of the normal radial extension thereof as shown in dashed lines in FIG. 8, thereupon rotating the comb basket assembly, and thereafter to incline and lock the said baskets on the other side of said extension and to reverse the operation of the machine, thereby accomplishing the centrifugal discharge of the honey successively from each side of the honey comb and body thereof.

As shown in FIGS. 3 and 6, the upper portion of the shaft is closed to form the dome 41 within and to the central part of which is embedded and welded the rounded gudgeon 42, arising vertically therefrom; the axis of gudgeon 42 being in alignment with the axis of said shaft and with the axis of gudgeon 21. Centrally located upon the underside of the web of the channeled bridge 19 is mounted the ball bearing 43, within which is journalled the middle portion of the gudgeon 42, and to the upper portion of which gudgeon, extending through an opening in said web provided therefor, is firmly secured the wheel 44.

Pivotally secured to the bolt 45, passing through the sides of the channel of the central portion of the bridge 19 and separated therefrom by the blocks 46, are the lower ends of the yoke 47, which yoke arising upwardly therefrom straddles with full clearance the wheel 44.

Mounted upon and welded to the bridge 19 are the widely separated upright posts 48 and 49, having formed in the top portions thereof the bearings 48a and 49a, in which is journalled the shaft 50, the said shaft passing freely through the tubular conduit 51, welded to blocks 52 and 53, secured by screws 52a and 53a inside and to the opposite walls of the upper portion of the yoke 47 (see FIG. 3). Secured to said shaft and rotating therewith on opposite sides of said yoke are the discs 54 and 55, separated by collars 56 and 57 from the conduit 51, welded to the hubs 54a and 55a respectively of said discs, which hubs are slidably splined to said shaft and longitudinally movable thereon; each of said discs being normally forced inwardly toward said yoke by helical compression springs 54b and 55b mounted upon said shaft between said hubs and rings 58 and 59, which rings are rigidly secured to said shaft. Mounted upon the outer end of said shaft is the pulley 60, connected by the belt 61 to a suitable source of power.

Arising from and welded to the inner end of the bridge 19 is the flat strip of metal forming the standard 62, integral with the top of which is the diagonally slotted barrel 63, through whose bore extends the rotatable rod 64, having the turning handle 65 secured to one end thereof. Hinged to the other end of said rod is the link 66, pivotally secured to the top portion of the yoke 47. Within the body of said barrel 63 is formed the diagonal slot 67 extending laterally and downwardly through the wall thereof (see FIGS. 1 and 2) and within said slot freely slides the stud 68 welded to the rod 64; said stud serving upon the turning of the handle 65 fully to the left, to advance to a limited extent the rod 64 to protrude the same out of the barrel 63, or, upon the turning the said handle fully to the right, to move backwardly to a limited extent said rod within said barrel. The effect of said limited advancement of the rod 64 is to induce the yoke 47 to incline forwardly upon the bolt 45, thereby causing the disc 54 to move away from the rim of the wheel 44, and the disc 55 to make close frictional contact with said rim. Contra-wise the effect of said limited backward movement of the rod 64 is to induce the yoke 47 to incline backwardly upon the bolt 45, thereby causing the disc 55 to move away from the rim of said wheel, and the disc 54 to make close frictional contact with said rim and to rotate in a direction opposite to that of the disc 54. As a consequence, the wheel 44 is caused to rotate in one direction or the reverse thereof as above set forth, and as mounted upon the gudgeon 42 affixed to the shaft 12, and rotating therewith together with the comb baskets hinged thereto as aforesaid.

The braking mechanism for controlling the stopping, starting and continuation of the rotation of the shaft 12 (more particularly shown in FIGS. 4, 5 and 6) includes the fixed washer-plate 69 welded to the top of the shaft 12, and the vertically movable washer-plate 70; said washer-plates having protruding therethrough with close clearance the lower portion of the gudgeon 42, and each of them preferably having their opposed faces lined with sheets of friction material. Pivotally mounted upon a shaft 71 journalled within bearings of the blocks 72 and 73 welded to the upper face of the washer-plate 70, are the ends of the clevis 74, the bow 75 of which is firmly secured to the inner bent portion of the rounded rod forming the handle 76, pivotally mounted upon the downwardly depending lugs 77 welded to and underneath the bridge 19; the arrangement of parts being such that upon the turning of the outer portion of the handle 76 to the horizontal position indicated in FIGS. 4, 5 and 6, the washer-plates 69 and 70 will be brought into close engaging contact and the rotation of the shaft 12 brought to a standstill. Thereafter, upon the raising of said handle the rotation of said shaft may be started, retarded or entirely freed in the manner well understood in the art.

In operating my aforesaid centrifugal honey extractor, the full combs of the honey of the size for the handling of which said machine is adapted, are uncapped on each side in accordance with the usual practice, and then the sections of said combs are respectively introduced within the comb baskets of the comb basket assembly 13, care being taken to guard against the breakage of said combs and to effect, if possible, a balancing of the weight of the combs radially about the shaft 12 to prevent undue strain thereon and to secure even rotation thereof. As will be observed from the drawing, the sections of comb when lodged in said comb baskets radiate circumferentially from the rounded wall of the hollow large sized shaft 12 so that while the inner ends of the said combs are at a substantial distance away from the center of rotation and thereby subject to increased centrifugal action, the outer ends said radiating combs extend outwardly in constantly increasing spaced relation until closely adjacent to the wall of the can 11, and in wide separation; the arrangement being such that upon rotation of the shaft 12, ample clearance of the combs one from all of the others is secured, and the ready escape of the honey from the honey combs and the unimpeded casting of such honey from the comb against the wall of the can 11, centrifugally and effectively accomplished upon rotation of said shaft and attached comb basket assembly 13, containing the said combs.

Of particular advantage in this form of my extractor, is the hinged connection of each of the comb baskets to the wall of the shaft 12, and the arrangement of parts whereby the said baskets may be uniformly spaced apart and radially inclined so that the honey may be caused to be centrifugally discharge successively from each side of the honey-comb as hereinafter described. For such purpose, the operator of the machine may first, through the employment of the handle 37, lock the comb baskets in the radially inclined position shown in dashed lines in FIG. 8 and after operating the extractor for a predetermined period of time, may stop the machine, and thereupon unlock and turn the baskets so as to expose the opposite side of the honey-comb and again lock the same in such turned position, and thereafter reverse the turning of the shaft 12 and operate the extractor; thereby fully accomplishing the extraction from each side of the honey comb through the rotations in opposite directions of the shaft 12.

Upon the sections of comb being introduced into the comb baskets as aforesaid, the motive elements of the apparatus are connected in operative relation and the shaft 12 and comb basket assembly 13 caused to rotate rapidly, the rate of speed of such rotation being manually controlled by the workman through the use of the braking mechanism hereinbefore described, care being taken not to rotate the frame too rapidly and thereby to break or crush the combs. As the honey is being extracted it will be thrown outwardly against the wall of the can and will flow downwardly to the inclined floor plate 15, from whence it will flow outwardly and be discharged through the outlet 16 into a receptacle provided therefor.

My invention may be embodied in other specific forms without departing from the spirit or essential character- istics thereof. The present embodiments, as above set forth, are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In a centrifugal honey extractor, the combination comprising: a casing; a shaft rotatably mounted within said casing; a series of open-work honey comb baskets; means on said shaft for pivotally connecting said baskets with said shaft; a plate having openings and fixed to said shaft; a handl affixed to the side of one of said baskets for vertical sliding movement and having one end that is insertable into one of said openings to fix the relative position of the basket with respect to the plate; and means for centrifugally discharging against the wall of said casing the honey of honey combs positioned within said baskets.

2. In a centrifugal honey extractor, the combination comprising: a casing; a shaft rotatably mounted within said casing; a flange on said shaft; a series of open-work honey comb baskets; means on said shaft for pivotally connecting the inner edges of said baskets in a vertical relation with respect to said flange; means comprising rigid rods connected between the outer edges of adjacent baskets, for equally spacing the outer edges of said baskets in equally spaced flaring relation with each other; a plate having openings and fixed to said shaft; a handle affixed to the side of one of said baskets for vertical sliding movement and having one end that is insertable into one of said openings to fix the relative position of the basket with respect to the plate; and means for rotating said shaft carrying said comb baskets and centrifugally discharging said honey from said combs against the wall of said casing.

3. In a centrifugal honey extractor, the combination comprising: a cylindrical casing; a shaft rotatably mounted within said casing with its axis coincident with the axis of said casing; a flange position on said shaft; a series of rectangularly shaped open-work honey comb baskets; means for pivotally connecting the inner edges of said baskets in a vertical relation with said flange; means, comprising fixed-length rods connecting the outer edges of adjacent baskets, for causing said baskets to be in equally spaced flaring relation with each other; means for maintaining the inner edges of said baskets in a fixedly-spaced relation with each other; means carried by one of said baskets for inclining said baskets from true radial position and locking said baskets in said inclined position a plate having openings and fixed to said shaft; a handle affixed to the side of one of said baskets for vertical sliding movement and having one end that is insertable into one of said openings to fix the relative position of the basket with respect to the plate; and means for rotating said shaft carrying said comb baskets and centrifugally discharging against the inner wall of said casing the honey of honey combs positioned within said baskets.

4. The subject matter of claim 3 and wherein said means for uniformly inclining said baskets from the radial and locking said baskets comprising said locking handle and connecting rods secured to and between and carried by outer end portions of the baskets.

References Cited in the file of this patent

UNITED STATES PATENTS

| | | |
|---|---|---|
| 1,176,562 | Jacquet | Mar. 21, 1916 |
| 2,255,775 | Hungerford | Sept. 16, 1941 |
| 2,281,788 | Morris | May 5, 1942 |
| 2,732,945 | Mandrapa | Jan. 31, 1956 |

FOREIGN PATENTS

| | | |
|---|---|---|
| 988,728 | France | May 9, 1951 |
| 292,587 | Germany | June 19, 1916 |